UNITED STATES PATENT OFFICE.

DANIEL E. SOMES, OF WASHINGTON, DISTRICT OF COLUMBIA.

IMPROVEMENT IN PROCESSES AND APPARATUS FOR CURING AND PACKING MEAT, AND FOR OTHER PURPOSES.

Specification forming part of Letters Patent No. 62,449, dated February 26, 1867.

*To all whom it may concern:*

Be it known that I, DANIEL E. SOMES, of the city of Washington and District of Columbia, have made new and useful Improvements in Processes and Apparatus for Preserving, Cooling, and Regulating Temperature, the same being applicable in the construction of preserving-houses, packing-houses, granaries, dairies. cars, carriages, ships, boats, refrigerators; also in cooling, warming, and ventilating houses, packing-houses, churches, halls, chambers, hospitals, and other buildings, chambers in ships, subterranean and submarine chambers or passages, and the like; to drying and curing fruits, meats, and other vegetable and animal substances; to cooling water. beer, brine, wines, liquors, milk, cream, and other liquids; and to cooling liquids while in a state of fermentation or distillation, and for other purposes, as hereinafter described.

It is always of great importance to be able to control the temperature and condition of the air. For the best development of animal and vegetable life the changes of seasons seem essential; but for special purposes it is often desirable to have a uniform temperature, and one that can be regulated wholly independent of the seasons.

So far as relates to extreme degrees of cold the modes of warming now in use have secured a good degree of success; but means for cooling are still very imperfect as now in use, and not generally resorted to, except in a few special cases.

As a fact of experimental science it is demonstrable that force may be expended either to increase heat or to diminish it, to warm or to cool. The chemical results of combustion may be used either to produce the most intense heat or indirectly to cool below the temperature of the severest arctic winter.

Steam may be used either for warming or cooling, for dissolving ice or for generating it. So of any motive power, as water, wind, or animal power, and the like. Each of these forces may be used at pleasure to secure a low or high temperature. Now, the object of my invention is to point out the modes in which the several forces at command may be employed to increase the comforts of civilized life, and the means necessary to render them serviceable in the various situations in which they may be wanted.

The means for generating heat and applying it for the purpose of warming and heating have been generally known, and need not be particularly described. I therefore proceed at once to state the means for producing cold. Although it may be unphilosophical to speak of cold as a positive principle or force, still, as it will much simplify the subject, I will use the term "cold" to describe or designate a positive and measurable entity. Heat and cold are really both but conditions of matter. The intensity of either is that which is measured by the thermometer; but the quantity of heat or cold is the product of intensity multiplied by the quantity of matter affected.

The first and most abundant production of cold is due to the changes of seasons on different parts of the earth's surface. This is made available by means of ice stored in winter, to be used in summer or in warmer latitudes. I have made important improvements in the means of applying cold in the form of ice for the various useful purposes above indicated, as will be hereinafter more fully described and explained.

The amount of air which can be cooled by a given quantity of ice may be calculated in the following manner, using round numbers and general terms: Air is about eight hundred times lighter than water, and its specific heat is about one-fourth that of water—that is, it requires only about one-fourth the amount of heat to raise a pound of air through a given number of degrees of temperature that it would to raise an equal weight of water through the same degrees of temperature.

Ice in becoming liquid or melting absorbs about 140° Fahrenheit of heat—that is to say, it absorbs an amount of heat such as would raise the temperature of an equal weight of water through 140° Fahrenheit. It is on this fact that the great value of ice as a cooling medium depends.

Thus, one pound of ice will cool one hundred and forty pounds of water one degree; and the water derived from the melting ice will be at 32° Fahrenheit. If, now, this water is to be, at the end of the operation, at the temperature of 62° Fahrenheit, then one hundred and seventy pounds of water would have its temperature lowered one degree; but as the specific heat of air is only about one-fourth that of water, one pound of ice will lower one degree six hundred and eighty pounds of air, or sixty-eight pounds of air ten degrees, or thirty-four pounds of air twenty degrees. It takes thirteen cubic feet of air of the common density to weigh one pound; therefore sixty-eight pounds of air are equal to eight hundred and eighty-four cubic feet, which will more than fill a cubic space nine feet each way—that is, one pound of ice, in melting, absorbs enough heat to lower the temperature of eight hundred and eighty-four cubic feet of air two degrees. This is on the supposition that there has been no waste.

I take advantage of these natural principles for the purpose of cooling air in the several classes of buildings and structures mentioned above. To do this it is necessary that the air to be cooled be brought in contact either directly with the ice, or with a good conducting-surface which is cooled by the ice. The latter plan is far preferable, so I have adopted it.

The following means of producing cold artificially may be employed where ice produced by natural causes cannot be procured in abundance:

First, the principle of evaporation. Whenever a liquid passes into the condition of vapor, a large quantity of heat becomes latent, and cooling is the result. The simplest application of this principle is the cooling of the air by sprinkling it with water, which, on evaporating, cools the air. Air may be thus cooled by passing it over water. This principle is also applied in the ice-machine, in which any volatile liquid, as ether, is evaporated. In order to save the liquid it is evaporated in one portion of the machine and condensed in another. Cold is produced at the place of evaporation, and heat when the vapor is again condensed. By keeping up this alternate evaporation and condensation any required amount of cooling or heating may be produced. The power expended in producing the evaporation and condensation is the cost of the heating and cooling. When only the effect of cooling is wanted, some means must be provided for carrying off the heat at the point of condensation.

Second, cooling by condensation and subsequent expansion of a permanent gas. When a gas is condensed by compressing it into a smaller space, the first effect is to develop heat; but if, while condensed, it is surrounded by a good medium for conducting heat, the condensed gas will now take the temperature of the surrounding medium. If the pressure upon the gas is now removed it will expand to nearly its original volume; and, in expanding, the heat still in it becomes latent, and a great degree of cold is the result. By the application of this principle machines for the manufacture of ice have been constructed. It may be also applied for cooling air to be used in ventilating, and for securing a low temperature in any building.

The gas commonly employed in this process is atmospheric air; but any gas may be used. When air is to be cooled by this process it should be condensed in tubes or cylinders placed at some distance below the surface of the earth, or in some cool situation where the heat developed during compression may be easily carried off.

Third, cooling by means of the condensation of vapor, which may be absorbed by a liquid. The well-known ammonia-machines for the manufacture of ice employ this principle. Ammoniacal gas is readily absorbed by water, which takes up about eight hundred times its own volume. If water containing ammonia in solution is heated, ammonia-gas will be given off. If the liquid is contained in a boiler closed by a cap leading to a worm or condenser, also closed, the gas driven off will enter the condenser under pressure. By increasing the heat on the boiler the gas will be driven into the condenser with such force as to become liquid. Heat will be developed as the gas liquefies, which must be carried off by water or some other cooling medium surrounding the condenser. When all the gas has been driven off from the boiler and condensed the boiler should be cooled. This will cause the ammoniacal gas to be again absorbed by the water in the boiler, which will, in turn, cause rapid evaporation of liquid ammonia in the condenser, and the development of intense cold in the condenser, which may be used for making ice, cooling liquids, air, gases, or any other material. The machine for driving ammonia-gas, condensing it, and again vaporizing it, may be arranged so as to give a continuous action. Any other gas capable of being absorbed by a liquid, and which, after being expelled from the liquid by pressure, may be used instead of ammonia. The researches of Faraday and others have shown that there are several such gases besides ammonia; but they have not yet been utilized for producing cold.

Fourth, cooling by means of what are known as "freezing mixtures." When solids become liquid a large quantity of heat is absorbed, or becomes latent. The common ice-cream freezer works on this principle. Salt and ice are both solids. When mixed, the salt and ice unite, and, in uniting, both become liquid, and, as a result, a great degree of cold is produced. Instead of ice and salt, a large number of chemicals may be combined so as to force the liquefying of the solids. The best materials are those crystallized salts which contain a large amount of water of crystallization, such as nitrate of ammonia, phosphate of soda, crystallized chloride of calcium, sulphate of soda, sal-ammonia, and the like, mixed with muriatic acid or sulphuric acid, or with water, or with mixtures of these.

Fifth, cooling by means of the low temperature of the earth at moderate distances below its surface.

It is well known that, except in the tropics, the mean annual temperature is not so high as to be disagreeable or oppressive to man, or to any of the warm-blooded animals. The heat becomes oppressive only because it is not evenly distributed over the entire year. Thus, the mean annual temperature of Boston, Massachusetts, is about 50° Fahrenheit; that of New York city, Philadelphia, and Cincinnati is about 53° Fahrenheit; and that of Washington city is about 55° Fahrenheit. At places farther south it is generally higher; but nearly the whole of the United States is embraced between 45° Fahrenheit and 65° Fahrenheit of mean annual temperature. It is also well known that at a comparatively short distance below the surface of the earth the temperature is nearly constant throughout the year, and at a given distance is nearly the same as the mean annual temperature of the place. Hence it is that temperature of well-water is nearly the same the year round. No exact rule can be given for depth below the surface at which the lowest temperature will be found, as it varies some with the latitude of the place, and also with the nature of the soil; but at depths of from twenty to forty feet below the surface of the earth the temperature will be generally found to vary but slightly during the year. At less depths a low and quite constant temperature will often be found, as is well known.

Water found in the earth at a reasonable distance from the surface, or if placed in vessels made of good conducting materials and surrounded by moist earth, will soon acquire the same temperature as the earth, and if this is sufficient depth below the surface of the earth, the temperature will be as low as the mean annual temperature of the place, or lower. This mode of cooling may be applied for many purposes, especially in cooling air and water and other liquids. For cooling air it may be applied either by forcing the air through pipes lying deep in the earth, or a current of water may be brought up from the earth to cool other liquids, and air or a current of water cooled by passing through pipes in the ground may serve as the medium by which other substances are cooled. Any liquid, as brine, spirits, ale, and the like, may be cooled by this process.

In patents issued to me bearing date February 28, 1865, and numbered 46,594, 46,595, and 46,596, I have described modes and apparatus for applying this process of cooling to the construction of refrigerators, condensers, packing-houses, preserving-houses, and for cooling and ventilating dwellings, churches, and other buildings.

Generally one or another of the above modes of cooling is resorted to.

I propose to combine them, taking two or more, as may be most convenient. In this manner I am able at all times to secure the temperature required for many purposes.

The next condition of air after its temperature requiring consideration is the quantity of moisture it contains. When the object is to preserve organic matter a very dry atmosphere is required. In dwellings, churches, halls, theaters, and other places where animal life is to be sustained, a certain degree of moisture is necessary. For increasing the moisture of air it may be forced through a spray-chamber, or over a vessel containing water. When it is to be warmed at the same time that it is moistened, a jet of steam will accomplish the object in a convenient way, if steam be used in the building; or a revolving wheel or cylinder covered with cloth, felt, or the like, as described in an application of mine now on file in the Patent Office, will be found an effective method for moistening the air.

The following modes of drying air may be employed:

First, passing it through absorbent materials, as lime, chloride of calcium, or other water-absorbing chemical compound.

Second, by condensing and cooling air the moisture contained in it will be given off and separated. Air cooled by the mode given above will be found to be very dry. The moisture contained in it will accumulate in the vessels in which the air is condensed and cooled. If an absorbent material, such as fused chloride of calcium, is placed in the vessel in which the air is condensed and cooled, the air, when again permitted to expand, will be found intensely cold and dry, so as to be well suited for use in granaries, preserving-houses, &c.

In Letters Patent issued to me March 21, 1865, No. 46,950, I have described the means necessary for applying this principle in the construction of granaries and other buildings.

Third, air is dried by heating. This, however, is only approximately, since the absolute amount of moisture remains the same after the air has been heated; but as the capacity for absorbing moisture is thereby increased, the effect of warming is the same for some purposes as drying the air. This makes it important, in all systems of warming the air in dwellings and other buildings for men or animals, that some means be provided for giving the requisite amount of moisture to the air as it is heated.

The next general principle to be considered after means for regulating the temperature and moisture of air, is the means necessary for purifying it, or removing from it such parts as may be obnoxious or injurious for any particular purpose.

Air may be purified, first, by the process of filtration. For this purpose charcoal, lime, cotton, or porous earthenware may be used, or any of these with sand or gravel. These materials strain out and separate any noxious matter that may have been mixed with the air. In the patent issued to me October 11, 1864, No. 44,671, I have fully described the means necessary for the application of charcoal for this purpose. Owing to the property which charcoal has of decomposing decaying organic matter, it is of very great value for purifying air and liquids.

Second, it may be purified by the action of chemicals or chemical substances, which destroy or change such matter as is required to be removed. Chlorine and chloride of lime have been long used for this purpose; but they are not useful except in particular cases as a disinfectant.

When it is desired to remove oxygen from the air, so as to render the air as nearly as possible neutral to organic matter, the deutoxide of nitrogen is very useful. The properties of this material are well known. It may be employed either as gas or dissolved in a solution of a protosalt of iron, such as copperas. It quickly removes all oxygen from mixtures of oxygen and other gases by combining with it, and is very important for preserving animal substances inclosed in tight vessels.

Sulphurous acid and alkaline sulphites may also be employed in a similar manner for removing oxygen from the air, and also as a disinfectant.

Third, pure air may be obtained by taking it from elevated situations. Means for this purpose are described in the patents issued to me bearing date April 9, 1861, September 13, 1864, and November 28, 1865. The air obtained by this process is both pure and cold.

Fourth, air may be purified by washing it by means of water in the form of spray, or in an artificial shower. This will remove the dust and the like. Steam or steam and spray may be used to wash out noxious gases and for disinfecting air. The effect of steam may be greatly increased by combining with it other disinfectant materials, such as chlorine, deutoxide of nitrogen, sulphurous acid, alcohol, camphor, vinegar, and the like. It may also be used as the medium for charging the air with perfumes, which, besides disguising noxious odors, in many instances destroy them, especially when applied by steam.

I have now explained the general principles in cooling, warming, drying, and purifying air, and will now describe the means of applying these principles in the various classes of improvements embraced in this invention.

In applying modes of warming and cooling, the first matter to be attended to is the arrangement of suitable devices for economizing the material employed. Thus, all walls, roofs, floors, &c., must be constructed in such a manner that they will conduct heat as little as possible. This may be accomplished by making the entire walls of dry non-conducting materials, such as poplar, pine, or other kinds of wood, or brick or plastered walls. A preferable plan is, however, to construct multiple walls, roofs, and floors with air-spaces between. Such constructions as applied to buildings are described in patents issued to me July 20, 1862, and reissued March 21, 1865, in which I have described the mode of constructing refrigerators and vessels either for storing or transporting all kinds of perishable articles, and also in the patent issued to me bearing date November 20, 1860, in which I have described such construction of walls, roofs, and floors of buildings as will retain either heat or cold, as may be required.

In the construction of buildings the walls may be made of any desired thickness, so as to secure strength and durability; but in vessels for transporting perishable articles the walls should be light. They may be made of cloth or other textile material rendered as near as possible air and water proof, and supported on frames or skeleton-boxes. Instead of cloth, several thicknesses of boards may be used, with air-spaces between filled in with charcoal or other material, or simply inclosing air.

For rendering porous materials, as cloth, wood, pottery, and the like, air and water proof, any of the ordinary materials for this purpose may be used. Paraffine, from its property of being unaffected by alkalies and acids, from being very indestructible, and on account of its freedom from odor, is a very useful material for lining boxes and barrels, and for coating cloth, paper, and other fabrics to render them air and water proof. A simple coat on the inside or outside will answer generally; but when great perfection of coating is required the entire article or fabric may be saturated with hot paraffine.

Paraffine and soapstone-dust well incorporated constitute a good coating for these fabrics or articles, soapstone being a good non-conductor of heat or cold.

I will now proceed to indicate the several modes in which I apply for useful purposes the principles and methods above described.

One of the most important of these is the construction of houses for preserving meat, vegetables, fruit, and other articles liable to decay.

The walls of these buildings should be formed so as to be as little as possible affected by changes of temperature. One mode is to place them beneath the surface of the earth, where the temperature is nearly equal the year round; but generally it is preferred to place them above ground, and in that case the construction of multiple walls, roofs, and floors, with air-spaces or some good non-conductor between, must be resorted to. The doors or other openings should be closed by gaskets or packing material of rubber, leather, or other substance. Means should be provided for ventilation, so as to change the air in contact with the article to be preserved.

The air should always be cooled by one or more of the processes or devices above or hereinafter described; it should also be dried. By keeping the temperature of the buildings slightly above the freezing-point of water, all kinds of fruits and vegetable or animal substances may be kept through all seasons. This temperature may be maintained by keeping a large mass of ice in the building or near it, but not in contact with the articles to be preserved.

The air inside the building may be caused to circulate either by means of proper machinery, or by arranging the mass of ice or cooling medium in such position that the air as cooled may fall, and warmer air take its place. In this case the building becomes self-regulating.

By placing absorbent materials, such as chloride of calcium, at some point of the current, it will be constantly dried, and by passing it in contact with charcoal it will be constantly purified of any unpleasant odor which might otherwise accumulate in a closed building.

The curing and packing of meats is one of the most important things that relate to the every-day business of life. In our country a large portion of the earnings of the laboring classes is expended in the purchase of meat, and the difficulty of obtaining a constant supply at a reasonable price is one of the greatest drawbacks to the comfort of the common people in all thickly-settled regions. The earth yields an abundant supply of meat, but it is not where it is wanted. In many parts of South America and portions of our own country good beef-cattle and other animals are produced in great abundance. Owing to the lack of suitable means for curing and packing the meat from these animals it is generally lost, or so badly cured as to be almost worthless, and not fit to use as meat.

Now, by the processes and means herein described, taken in connection with the several patents already secured to me, animals produced in any part of the earth may be dressed, packed, and cured at all seasons of the year, and transported, so as to furnish the meat in good condition at those points where it is most valuable.

To this end my inventions embrace the following matters, viz:

First, the construction of buildings for slaughtering and dressing the animals in such a manner as to secure at all times a temperature sufficiently low to cool and preserve the meat in good condition for packing and curing.

Second, the construction of buildings with suitable means for salting, packing, and curing meat at all seasons of the year and in all climates.

Third, means of curing hides, and securing in merchantable form the tallow, hoofs, horns, and other offal.

Fourth, means for transporting from warmer latitudes articles which, by the present processes in use, are injured or spoiled during transit. It will be convenient to have the buildings for slaughtering and curing immediately adjoining, but divided by proper walls. If a water-power can be obtained convenient, all the buildings should be erected on it, for these operations, to be carried on successfully, require the expenditure of force. If a water-power is not convenient, then a steam-engine will furnish the best source of power, although animal-power may be used. The buildings should be of ample size, for the reason that there will be less loss from changes of temperature. The walls of the buildings should be constructed with special reference to resisting the transmission of heat. In order to keep the temperature of the buildings under control, means for introducing and removing air must be provided, and all the windows, doors, and skylights should be made double or multiple, and so as to close tightly. For many purposes it will be most convenient to have several stories of the buildings below the surface of the earth, in order to take advantage of the equable low temperature which obtains at moderate distances below the earth's surface. In such subterranean buildings a shaft with skylights and reflectors will furnish an abundance of sunlight.

If there are not surface-openings or streams of fresh water near, a well should be sunk; or, if that is not practicable, large water-cisterns must be constructed to retain the rain-water collected in the proper seasons. If surface-water is used it may be cooled by any of the modes of cooling herein described.

The first part of cooling can be cheaply effected by means of pipes and cisterns lying deep in the earth, as described in my patents dated February 28, 1865. If not sufficiently cooled by this process, one or more of the other processes herein described may be used to complete the cooling.

Many of the details of construction and arrangement of buildings in my improvements are the same as ordinarily used in the best-equipped establishments, and therefore need not be particularly described. The construction of cattle-pens and the mode of killing and dressing the animals I have not attempted to improve. It is of great importance in all warm climates that all parts of the buildings, all implements, and even outhouses and adjacent grounds and buildings, be kept as clean as possible and free from all decaying matter. All offal should be immediately cooled by running it into large reservoirs in the ground or the water, and mixing it with lime and salt, or either, before fermentation takes place, and then dried by means of hot air and smoke, and converted into a valuable manure, which commands a ready sale on the Atlantic sea-board. The temperature of the packing-house should range from 40° to 50° Fahrenheit the year round. This temperature can easily be maintained by the means herein described without resorting to the use of ice, or to compression and expansion of the air.

First, the air is taken from an elevated point, where it is pure and of a somewhat lower temperature than at the earth's surface. It is next cooled by passing down a shaft or tower cooled by evaporation, and also by passing over and around pipes filled with cold water coursing through them. The water comes from a deep, cold point in the earth, and passes through coils of pipes in the tower, and then down again into the earth, to be cooled after it has been partially warmed by the air passing over the pipes. It is further cooled by passing through tubes or trenches connected with the tower lying deep in the earth or in water.

By these several processes the air will, for packing meat and for many purposes, be sufficiently cooled; but where a greater degree of cold is required, it may be effected by passing it through vessels filled with ice or other cold substance, or by compression and expansion, as hereinafter explained.

When very large quantities of air must be rapidly cooled by the process of condensation, there are several modes of carrying off the heat developed during the process.

Thus, the air may be condensed in pipes similar to what is known as the "surface-condenser" for steam-engines, which are in contact with water or moist earth; or the surface of the condenser-tubes may be covered with cotton, tow, hemp, cloth, or any fibrous material, kept moist, and having a blast of air playing upon them. The blast of air will cause rapid evaporation on the surface of the condenser-tubes, and so keep the temperature down.

This mode is especially applicable when a body of cool moist earth or water is not attainable for carrying off the heat during the process of condensing.

By inclosing the condenser-tubes, covered as above described, within a larger tube, and applying a suction-blower or an equivalent device to one end, the air is rapidly drawn through the space between the tubes, producing intense cold. Water in jets or spray may be let in to keep the fibrous covering of the small tube constantly wet. This mode of cooling is applicable to the cooling of liquids, as well as air, the smaller pipe being filled with water or other liquids. It may also be applied to cooling tanks of liquids—as brine, beer, and the like—without first compressing the air, if desirable.

By the process of condensing, cooling, and expanding, any quantity of air may be cooled to any degree desired, and, excepting the cost of apparatus, the amount of cold produced will be in proportion to the amount of power expended in working the condensing-pumps. By this process a sufficiently low degree of cold may be produced to manufacture ice.

Instruments to indicate both the temperature and state of the air as regards moisture should be placed in every separate portion of the building. Should the air be too moist after being condensed and cooled, it should be dried by being passed through some water-absorbent material—such as dried chloride of calcium, which, when it is charged with moisture, may be dried by heating and used over and over. Disinfecting materials—as sulphite, sulphurous acids, chlorine, carbolic acid, lime, chloride of lime, creosote, tar, coal-tar, gypsum, and the like—should be used, so as to keep the entire premises free from any taint or odor, and also for thoroughly disinfecting and preventing all decay in the offal, hides, hoofs, hair, and the like.

The use of deutoxide of nitrogen will remove every particle of oxygen from packages containing glue-stock, hides, offal, and other portions which might be injured by close packing. Deutoxide of nitrogen will preserve all animal matters from putrefactive fermentation.

It may also be applied in curing hides and glue-stock, and the like. The water used in making brine may also be purified from any oxygen dissolved in it by means of deutoxide of nitrogen in the form of gas, or by a solution of it in any liquid.

The smoke and waste heat from the furnace of the steam-engine employed may be used for drying the offal, so as to be made into manure.

The temperature necessary for the successful salting of meats is from 40° to 50° Fahrenheit—say 40° to 45° for pork, and from 45° to 50° for beef.

As I have already intimated, there is in every latitude a point in the earth where the influence of the sun's rays is not felt. This point varies in depth below the surface, according to the latitude and local causes, such as cold or warm springs of water. It is known from observations made in deep cellars, wine and ale vaults, and in deep wells and mining-shafts, that a depth of from ten to forty feet would be sufficient to insure a temperature of from 40° to 50° Fahrenheit during the hottest days in summer.

I will now proceed to describe in detail one of my modes of constructing buildings and appurtenances for packing meats, curing hides, &c.

In constructing a packing-house, excavation is first made, when circumstances will permit, to a depth in the earth sufficiently low to reach a naturally uniform temperature. Thick, strong walls are carried up to a point within a few feet of the surface of the ground, when multiple or hollow walls are commenced and carried to a height of, say, fifteen to thirty feet above the ground, with air-spaces between them, or having the spaces filled with sawdust, charcoal, cotton, or other fibrous substance, or any article that is a non-conductor of heat. The walls should be tied together by cross-timbers or other material as they are laid up. The roof of the building is also double or multiple, like the walls.

A series of windows of glass are inserted in the walls and roof, with spaces made air-tight between them, which serve to admit light and exclude heat, air being a non-conductor of heat, and glass a poor conductor. Wooden or other screens, painted white and made larger than the windows, are placed a few inches from the walls and roof of the buildings, to protect the glass from the rays of the sun, while the space admits light. Transparent or translucent screens are still better than wooden ones. In one of the spaces between the walls and roofs I insert perforated pipes filled with water. The spray or jets of water keep the walls and roofs wet, while a suction-blower is applied to rarefy the air and produce rapid evaporation, thereby keeping the walls and roof cold. Flues are made in the walls for purposes of ventilation, with dampers and registers to regulate the draft.

The buildings are ventilated at the top in any of the known ways, and arranged to be opened and closed by dampers or registers operated by a cord or rod, or otherwise. Ventilating-flues are constructed in the building or near it, the upper ends of which reach nearly to the roof of the building inside. A suction-blower or equivalent device is attached to the lower end, and the air is drawn down the flue and forced to some other apartment, or outside of the building, while the space it occupied will be filled with the cooler air below, giving place to still colder air, admitted as hereinafter described.

An effective means for producing a draft outward or inward is found in my patent blower or revolving wheels, for which Letters Patent were granted to me on the 28th day of November, 1865, No. 51,237.

The packing-house is divided into several apartments; for instance, one is used as a curing-room, others for cutting and cooling, and others for cooling the carcasses, and others for storing the packages of meat, hides, and the like. In the curing-room are placed a large number of vats or tanks, in which the meat is cured.

These tanks are made of double or multiple walls, having a current of cold water running through the space next the inner wall, pumped from deep wells in the earth, or cooled by running it through tubes or tanks cooled by ice or any cooling process, substance, or mixture, artificially, or by running the water-pipes in the earth, and then through the cooling-tanks or around them.

Air may also be blown over the tops of the tanks, producing evaporation, and thereby cooling the brine contained therein.

One space between the walls of the tanks may be filled with ice or brine, or ice and salt, or any cooling mixture. The air-spaces between the walls of the tanks should be connected together, and a suction-blower attached to produce rarefaction of the air in drawing it through said spaces. Attached to or near the packing-house is a slaughter-house, constructed in a similar manner to that of the packing-house, with spouts to conduct the blood and offal to reservoirs in the ground, to be mixed with lime and other articles and fitted for the market, as hereinbefore described.

There should be but one entrance to the slaughter-house for the cattle, and that should be approached by a narrow passage leading from the cattle-pen nearest the slaughter-house. The floor of this passage is an endless one, moving on rollers, and is constructed similarly with the endless platform on which a horse propels a thrashing-machine or a circular saw, but is moved by steam or other power instead of the animal that gets upon it. When a sufficient number of cattle are on the floor of this passage, power is applied, the rollers turn, the endless chains to which the narrow floor-strips are secured move forward, and carry the cattle to the door of the slaughter-house, or to a yard near it. There is no chance for them to return, since the lower end of the passage is strongly barred till another batch is ready to be carried forward. The bars in the rear of the cattle may be made stationary, or they may be attached to the platform, and move forward with the cattle till they reach their destination, and then be carried back to be used again. The walls of the passage should be made smooth and strong, and so close to the platform as to leave no room for the hoofs of the cattle to get caught. After the cattle are slaughtered they are conveyed to the cooling-room, which may be in the slaughter-house or in the packing-house. The cooling-room and the cutting-room have latticed or perforated floors, and a casing near the walls, which also has openings or holes, through which air is forced upon the carcasses and meat for the purpose of expelling the animal heat. Connected with the packing-house, or not far from it, is a tower six to twenty feet in diameter, extending sufficiently high to permit its top to be in a stratum of cool air—say from fifty to one hundred and fifty feet above the ground. This tower is made with hollow walls or air-spaces, in order that the sun's rays shall have no power to heat the air on its downward passage within the tower. Another air-space may be made in the walls, which shall be open at the top or sides. If this space extends into the earth to near the bottom of the tower, and water is admitted, it will tend to cool the walls by the action of evaporation going on within the space.

If a suction-blower is applied to the said space, the walls will be still further cooled. Air-ducts running from the bottom of the tower to the packing-house, tanks, and slaughter-house, and lying deep in the ground or a body of water, will prevent the air, as it passes through them, from becoming warm, and in hot weather will cool it, since the temperature of the earth is lower in summer than that of the atmosphere at the altitude above named, and is uniform at all seasons of the year. Air taken from a great height by the tower and through the ducts is much purer and better adapted to curing meats than that taken from nearer the surface, and is also drier. It has been ascertained by chemists that the air is filled with floating microscopic germs. Pasteur, in making experiments, has found that the air contains fewer of these germs in proportion to its elevation above the earth.

As evidence that these germs promote decomposition and putrefaction, it is sufficient to state, in the city of Paris, where the air abounds with them to more than an ordinary degree, it is almost impossible to amputate a limb and perform a successful cure, while in the rural districts, where the air is comparatively free from these germs, no such difficulty exists.

It is generally conceded, I believe, that heat and moisture are great promoters of decomposition; but heat, as we know from the experiments and practice in curing meat in South America and other warm countries, has less to do with decomposition than moisture.

Now, by my method I not only secure a pure and cool atmosphere, but it is also made drier. As it passes over or through metallic pipes its moisture is condensed at the dew-point, and deposited in the form of drops, leaving the air peculiarly adapted to the process of dry-salting. The air is drawn down the tower by blowers or pumps.

The tower may be circular in its cross-section, and near the top may have a number of openings, dividing its circumference equally, and large enough to permit a free ingress of air. It should be covered with a cap of heavy metal, or other suitable material, which shall extend down into the tower like a fluted cone, inverted, at such an angle as shall deflect the wind downward as it blows in from any quarter, and to such a distance below the openings as to prevent the wind from blowing through or out of the openings opposite to that through which it enters.

The supply of air thus directed down the tower will be greatly augmented, and the labor of the blowers lessened; or a hood or equivalent device may be placed on the top of the tower, so arranged that its opening shall always point to the wind, thus catching and turning it downward.

Common trenches tightly covered may be used for the main ducts under ground, or, which is preferable, large or small pipes or tubes of metal. Small pipes may be connected with the ducts or tower, and run through tanks of ice or other cold substance, in order to bring the temperature of the air to a very low point, for special purposes, as manufacturing ice, or for any purpose.

I also, for special purposes, force air into large cylinders or common pipes, and compress it.

The cylinders are sunk deep in the earth, or else surrounded by some cold substances, so that when the air is heated by compression its latent heat is conducted by the earth or water in the earth, or whatever the surrounding cold medium may be.

After the air so compressed becomes cooled it is permitted to escape through a small aperture into the room or vessel to be cooled, when it suddenly expands and becomes very cold.

In this room, if I desire to make ice or want a very cold temperature, I use chemical properties, as solid carbonic acid or sulphuric ether, or both together, in a reservoir or cylinder surrounded by cold water or brine, or ice, or any cold mixture or substance, as sulphurous acid, ammonia, &c., to absorb the vapor and lower the temperature to a cold point.

Within a building, constructed as above described, or otherwise, a room may be constructed with thick or multiple walls and cooling appliances, already described, and others, to be hereinafter described, for the manufacture of ice, while at the same time other apartments in the buildings may be used for other purposes.

The walls and ceilings of this room should be sufficiently strong to resist great pressure from without, as it is intended to exhaust the air within the room to produce rarefaction and evaporation. This is done by means of an air-pump or blower, so placed as to draw the air from the room, and force it into other apartments.

To lower the temperature of the air before it is admitted to the pumps to be compressed, I proceed, first, to use several air-pumps placed side by side, with pistons well fitted to their barrels or cylinders, said cylinders being placed within a vessel containing cold water pumped from deep wells in the earth, or passed through pipes from cold springs or streams, or other bodies of cold water; or the water may be carried through pipes in the earth, as before described.

If there be a large supply of cold water at hand, a rapid current may be permitted to run through the vessel and around the cylinders. The pipes, before reaching the said vessel, may be surrounded by a vessel of ice or other cold medium, before described. The vessel containing the pumps may be also filled with ice, &c.

Air-tubes are run through the ground or the water-pipes, or other cold substance, and also through the vessel containing the air-pumps, if desirable, conducting the air to the pumps, and cooling it before it is compressed.

The pumps are operated by steam or other power through connecting-rods to cranks on one or different shafts. By thus cooling the air before it is compressed in the machine, the volume is very much reduced, thereby saving in the expense of machinery, and in its operation. The air is forced into pipes or cylinders surrounded by the earth or water in the earth, or by some cold agent, as before described, which carry away the balance of the heat remaining in the air after being compressed.

Second, I insert one or more large cylinders in the earth in a vertical position, and surrounded by cooling agents, as before set forth.

Each of such cylinders is furnished on one side, at or near the bottom, with an air-tight valve opening inward, for receiving the air from the outside of the cylinder, and on the other side with a similar valve opening outward into an air-tight passage or channel, communicating with a large and powerful receiver of metal, capable of resisting an inside pressure of fifty atmospheres, more or less, and, like the cylinder, bedded in and surrounded by cold agents or mixtures. On the inside of this receiver are valves, also air-tight, and opening inward, which permit the ingress of the air from the cylinders, but prevent its return.

Each of the cylinders is accurately bored and fitted with a ponderous piston, that shall move easily and freely, though tightly, up and down within it. The piston is fitted with appurtenances by which it is connected with the cylinder, and with the apparatus for hoisting it. This apparatus is so constructed that the piston may be lifted to any desired height, and when this height is attained the piston is disengaged from the hoisting apparatus, and it falls. This is effected as follows: Attached to the top of piston is a loop, the top of the horizontal bar of which is a ridge or angle falling away on each side, like a house-roof, to the bottom or under side of the loop, which is some inches above the piston. Now, there are two upright parts extending up from the cylinder, and parallel and far enough apart to admit the piston to slide up and down between them. On the top of these uprights is a crosspiece, which supports the bearings of a pulley-sheave, over which a rope may run. One end of this rope is attached to a drum driven by hand, horse, steam, or other power, and the other end is made fast to a pair of hooks jointed crosswise, so that as one end of the arms shall be forced together, the other end shall open out apart from each other. The lower ends of these hooks are in contact; but their points are far enough apart to receive between them the edge or ridge of the loop of the piston.

The weight of the hooks will carry them down until they latch in under on each side of the loop. The upper arms of the hooks, being larger, keep the hooks latched by their preponderance in weight.

Now the piston is ready to be hoisted. When the height has been fixed from which it is desired to let fall the piston, at such height, on the inside of the uprights, is placed, on each one of them, an inclined plane, sloping upward and inward to such a degree that the space between them shall be so narrow that the arms of the hooks, as they reach, shall close and open the bottom of the hooks and release the piston, which falls with a force due to the weight of the piston, the distance it falls, and its velocity, accurately directed by guides upon the air which has filled the vacuum in the cylinder caused by the raising of the piston. The air receiving such a blow is forced along the passage into the receiver, where it is retained, and this process is repeated until as many atmospheres are crowded into the space of one as is desirable.

A powerful spring may be introduced into the bottom of the cylinder, so that the fall of the piston may be broken at or a little above the valves without allowing it to come in contact with the bottom of the cylinder. The piston may have a cross-head, from which two plungers may work in air-tight cylinders or air-cushions, which can be so adjusted as to check the fall of the piston at the proper instant. The valves may be placed a little above the bottom of the cylinder, thereby leaving an air-cushion below the valves; or springs may be attached to the bottom of the piston.

The air, as it is forced into the receiver, is made warm by the compression; but the temperature is soon reduced by conduction to an equality with the natural one of the earth or water, or whatever may surround the receiver, or lower, if desired, by the employment of frigid agents and compounds, so that when suffered to escape from the receiver into any apartment its sudden expansion will be accompanied by a depression of its temperature below that of the receiver in proportion to its increase in bulk and decrease in pressure. I use the same cooling agencies to cool the air before and after it is compressed by the above-described apparatus that are herein described or referred to, or their equivalents, whether used singly or in combination.

I apply this principle, and also the apparatus and devices, so far as practicable, for forming or compressing liquids; but liquids, being more solid than air and gases, necessarily oppose a sudden resistance to the falling piston, or weight upon the piston, causing a shock, and, to some extent, a loss of power. To obviate these objections I construct my apparatus substantially as follows:

The piston, instead of being the size of the cylinder, is made much smaller, and is fitted to fill an aperture in the head of the cylinder, so as to move up and down easily. This head should be a part of the cylinder or firmly fastened to it.

Valves are placed in the cylinder or pipes leading from the supply-fountain to the cylinder, and also in those leading from the cylinder to the reservoir or receiver, the former opening inward to admit the liquid, and the latter opening outward to permit its escape from the cylinder to the receiver.

When the supply-fountain is below the top of the cylinder the water will flow into the vacuum caused by the raising of the piston. When it is above the top of the cylinder selfacting valves or others should be provided to cut off the supply when the cylinder is full.

The lower end of the piston is cone-shaped or pointed, and therefore penetrates the water without much resistance.

Water may be thus forced into large reservoirs or vertical pipes, and used as motive power in piston-pumps, water-wheels, and the like. Air and gas, compressed as herein described, may be used for the same purposes, and in like manner. They may be used in steam-engines and the like, and afterward used for cooling purposes. If there is any gain of power it will be found in natural motion, or the momentum of the falling piston or body upon the piston. Instead of constructing the compressing apparatus as above described, it may be so made as to use steam direct in raising the piston. I apply this principle, and also the apparatus and devices, to the warming of buildings and apartments. Instead of crowding several atmospheres into the space occupied by one, and retaining it there till the latent heat is conducted away, the air is permitted to flow from the cylinder, after being compressed through channels or tubes, without obstruction, and as rapidly as possible to the building or room intended to be warmed before it is cooled.

Factories and other large buildings may be heated in this way with economy, especially if the temperature of the air is first raised to the temperature of the earth by conducting it through pipes, as herein described. If the air is taken into the cylinder at 45° to 50° Fahrenheit, and compressed at the rate of forty atmospheres, as may be done, at every stroke of the falling piston, a high degree of heat may be cheaply produced.

The piston or plunger should be constructed in a cylindrical form, and filled in with clay, sand, water, iron, or any other heavy substance, in order that it may be graduated in weight without changing its size or form. The bottom, of course, must be tight and strong.

I also apply this principle and apparatus to the salting and curing of meats by forcing the brine into the pores of the meat, and also by forcing gas composed of preservative chemicals into the pores of the meat.

If the meat has been dressed and cooled in the manner above described, it is then ready for salting and curing. This may be accomplished in many ways, as follows:

First, by the common and well-known processes, by means of brine or dry-salting. The latter process requires the air to be dry, and at a moderately low temperature. After being salted the meat may be smoked or dried. I have found that meat will take the brine in a shorter time if it is agitated. Agitation may be produced either by causing the circulation of the brine by means of a force-pump, or by the forcing apparatus above described; or the curing may be done in a revolving tub, tank, or other vessel; or the ordinary barrels in which the meat is salted may be made to revolve or roll.

Second, by inclosing the meat in a strong tank or other vessel, and forcing the brine or other preservative liquid into the pores of the meat by means of pressure applied by means of any suitable apparatus, such as a force-pump; or by hydrostatic or pneumatic pressure a great saving of time may be accomplished. Alternate exhaustion and pressure may be applied at the same time.

Third, by passing the brine or other preservative fluid through the blood-vessels of the animal. By this process the entire carcass is salted at the same time. The animal must be killed by opening an artery. A stream of cool, pure water should first be injected, so as to enter by the arterial system, and exit by the venous system. This will remove all traces of the blood, and at the same time cool the flesh. A weak cool brine should next be prepared and passed through the blood-vessels, then followed by stronger brine till the salting is effected. Any of the salts and spices with which it is desirable to impregnate the meat may be combined with the brine.

In fact, any antiseptic compound may be applied in this manner in this process, and also those above described.

Fourth, by impregnating air with salt, saltpeter, or other chemicals, and forcing this through the meat by powerful pressure.

This mode is applicable in salting and other curing. The salt and other solid materials, in the state of impalpable powder, should be mixed with the air, and forced by a pressure of from five to twenty atmospheres through the meat.

Gaseous materials of a preservative nature may also be mixed with the air, in the manner as follows: Chemicals, hereinbefore referred to or described, are placed in a hot furnace or tubes and volatilized, and then mixed with air and forced through hot tubes into a curing room or vessel containing meat to be cured. By this process all impurities in the atmosphere are destroyed, and a gas prepared which, if brought under a pressure of from 5° to 20°, will cure the meat in a few hours.

The compressing apparatus described above will serve as a convenient means of carrying out this process, since a degree of pressure sufficient to force finely-divided solids, as well as gas, through the meat may be easily produced.

Fifth, by drying.

The process of curing meat by drying is well understood, and has long been practiced. By keeping the meat cool, and forcing over and through it dry, pure air till nearly all the moisture is removed, the meat will be preserved. This process of drying may be used in conjunction with any of the processes above described for salting, so as to produce dry-salt meat. The dry air may also be charged with the vapors of creosote, smoke, or other antiseptic gases, so as to produce smoked meats, such as hams, dried beef, venison, and the like.

Cooling meat: It is a well-known fact that before meat can be cured the animal heat must be removed; or, in other words, if the animal heat is not expelled before brine is introduced sufficiently strong to cure the meat, the pores will be closed, thereby preventing the escape of decomposing gases. In hot weather, when the animal is heated, the cooling process should be applied with caution.

The sudden introduction of warm meat into packing-houses where ice is freely used causes the surface to be chilled before the heat has had time to escape, causing the meat to sour near the bone. This difficulty I obviate in several ways.

My first method is to immerse the carcass in cool water, and let it remain until the heat is nearly expelled. Cold water or weak brine is then introduced.

Second, I remove the heat by forcing water against the carcass or meat by means of hose-pipes or otherwise.

Third, by forcing small jets of water or spray upon the meat.

Fourth, by forcing air either moderately cool or at a low temperature.

To facilitate the cooling of meat under the first head, I construct vats or tanks, and partially fill them with water or weak brine.

The meat is then introduced, and allowed to remain till the temperature of the meat and that of the water become nearly equalized.

The water is then let out, and water or brine, made cold by passing pipes in the earth, or otherwise, as herein described, admitted to complete the cooling process; or a series of vats may be used, and the carcasses or meat transferred from one to another, the last being colder than the first; or it may be put into a sluice or stream of water and cooled.

In a patent granted to me September 13, 1864, I claim forcing air through channels or tubes in the earth, thereby cooling it before it comes in contact with the meat.

I now propose to force the air, before or after it is cooled, through jets of water or spray.

Blowers placed under or near the latticed floors of the cooling-rooms, and forcing the air with great power through the floors and casings while the carcasses are hanging up or lying down, and through the passage between the cooling-rooms and slaughter-house, and out at the door through which the cattle are brought in, will cause a strong outward current, which will keep flies and dust from entering the slaughter or packing house. If the air which supplies these blowers is drawn from the curing and other apartments through apertures in the partition-walls near the ceiling or roof, a large supply of cool, fresh air will be admitted through the tower and tubes, to fill the place of the foul air thus blown out through the slaughter-house. A large number of rooms, connected together by means of holes or tubes, may be thus kept cool by rarefaction of the air within them. In these rooms I place flaring pans, of metal or other suitable material, with the number of pounds of ice which each will hold, when solidly made, in it, and conduct air, made cold by means of any of the processes herein named, over the pans when filled with water. The air is also cooled in the rooms by any of the within-described means.

The air may be drawn from the first room to the last through all the intermediate ones by one set of blowers, and then compressed, as hereinbefore described, and the process may be repeated as often as desired.

The pipes in the tower, as well as any others, may be covered or wound with material and kept wet, and a suction blower or pump applied to produce evaporation and rarefaction in order to cool the water within the pipes.

A wall surrounding the packing-house or other buildings, a few feet, more or less, from the buildings, above the top of the buildings, will protect the walls from the heat of the sun's rays; or said wall may be carried only to the eaves of the building, or just below, with the roof of the building extending out over it, with spaces in the wall or roof for ventilation; or, if the building is a low one, the roof may be extended to the ground to protect the building from the effects of the sun.

A packing-house may be built so high as not to need a tower if there be left a space from the lower floors to the top for free ventilation, and the walls are built to exclude heat and air from the sides or bottom, except cooled as herein described; but the expense of such a building would be a serious objection.

A high building with rooms in the top story for curing the meat might be constructed with apparatus for hoisting; but such an operation I do not deem feasible without very large expenditures of money.

To cool vats of brine, beer, and the like, I arrange pipes over the tops of said vats, through which cool or cold water is constantly passing. These tubes may be bent so as to extend down a few inches into the vat, and then run direct across or in coils to the other or opposite side, and up and over the top of the wall of the vat. Water cooled as herein described may be used in said pipes.

A platform to convey the cattle to the slaughter-house may be constructed and placed upon small wheels and run upon a railway-track; but I do not consider this method so good as the one before described.

While in the active process of killing or cooling, all the ventilators should be closed in order that no air shall be admitted to the interior of the buildings except that which comes through the tower and tubes, which will always be pure and cool. Charcoal and other purifying and disinfecting substances are used in the tubes and in other places in and about the buildings.

Coils or systems of water-pipes, through which cold or cooled water passes, are arranged in front of air-blowers of the usual kind, or in the rear of suction-blower, so that while the blowers are in operation a blast of air will be driven or drawn through said system of pipes, thereby cooling it for the cooling of meat or apartments, or for other purposes.

In order to produce ventilation, and at the same time to lower the temperature of the air without the aid of machinery, I connect a pipe or flue near the top of the room or rooms, and conduct the warm vitiated air into a chimney heated in the usual manner or by gas-jets; or a flue may be constructed against or around cylinders used for compressing air. The heat produces a draft drawing out the warm air, while the air admitted to supply its place will be cooled by its passage over water-pipes, or through air-tubes running through water-pipes, or by other cooling processes and devices, as herein described.

In dwellings, and in other buildings where circumstances will permit, apertures are made through partition-walls. Another is made into a flue or chimney near the ceiling of the room. Into this aperture may be inserted a tube, with a valve so arranged that it will open inward, but is prevented from opening outward by means of a shoulder or rest connected with the tube or with the valve.

The draft produced by the heat in the chimney will cause a current of air from the room into the chimney. Should there be a tendency to back smoke the valve will instantly close and prevent it.

Another plan is to establish a tube in each room or apartment, causing them all to connect with another tube, one end of which connects with the kitchen-chimney, or some flue heated by ordinary means, or by gas-jets, or in any suitable manner. If the windows and doors are kept closed, and the registers or valves communicating with tubes in the earth, or tubes cooled as herein described, a flow of bad air will be carried off through the chimneys and the like, and good cool air admitted.

The importance of being able to cool and ventilate a single room, especially in case of sickness, in a cheap and simple way, has long been felt. This object I have accomplished, and on the 3d day of October, 1865, I received Letters Patent for my invention.

As I wish to combine some or all of the devices and principles therein set forth with those already herein described, the following extracts from said Letters Patent are herewith incorporated:

"It is a well-known fact that, if heat in any form be introduced into a cool room, the air coming in contact with it suddenly expands and rises, giving place to other portions, which, in turn, undergo the same change in temperature and place.

"So, too, if any cold substance be admitted into a close, warm room, the same agitation of the air is caused and the temperature lowered in all parts of the room in proportion to the amount of the cold substance introduced."

Now, this part of my invention consists in constructing and using apparatus so as to make these laws available in cooling apartments.

These results I accomplish by making and using a portable air-cooler, capable of holding cold water, or any other cold substance or mixture, in separate compartments, or otherwise, with air-passages so arranged as to produce a current or currents of air.

A box or other vessel, made in any of the known forms, sufficiently strong and tight to hold water, and filled with ice, would, to some extent, answer the purpose intended.

But as it is important to regulate the temperature as well as to lower it, to economize in the use of cooling agents, and, also, to have a thorough ventilation, I proceed to make of zinc, tin, iron, wood, or any suitable material, a vessel in any desirable form, six to ten feet high or long, and one to three feet diameter, more or less, according to the height and size of the room to be cooled, with openings in or near the top through which to receive the cold substance.

The upper end or head of the cooler I place a few inches below the top of the sides or cylinder, to form a chamber, over which is placed an adjustable cover.

I then insert one or more tubes, pipes, or channels, extending through the ends or heads of the cooler, and open at both ends, to admit of a free passage of air through their entire length. Now, if this vessel be filled with air, the air in the tubes becomes cold and condensed, and consequently falls out at the bottom, drawing warm air into the upper ends of the tubes, to be cooled in turn, thus keeping up a constant action of the atmosphere until it is nearly equalized in temperature throughout the room.

When I wish to use two or more substances of a different temperature, I make another vessel about the same height of the one described, and large enough in diameter to encircle it, with an air-space between them for a downward current of air. One of these vessels I fill with ice, and the other I connect with a water-pipe, such as is used in cities where there are water-works. If the pipe is extended deep into the earth, or into cold water in the earth, in order to have its contents cooled before passing through the cooler, a small quantity of ice will be sufficient to cool a room of ordinary size, and, except during very hot weather, it will not be required at all. I sometimes construct air-channels in a spiral form, in order to compel the air to travel a greater distance than it would do were they made straight, thereby more thoroughly cooling it. These spiral channels may be formed in the space between the two cylinders above described by placing therein strips of tin or other suitable material, and winding them around the body of the inner cylinder, so as to produce the desired result and add strength to the cooler.

When it is desired to secure ventilation in the room to be cooled, I conduct the air from without, by means of a tube or its equivalent, to the tubes in the cooler, or to the chamber in the top of the cooler. The cooled air within the chamber or tubes, being heavier than that which has not been cooled, falls, as before described, and draws in a new supply from without, thus securing a thorough ventilation without producing a blast or dangerous draft.

There should be in some part of the room an outlet, with a register or valve, for the foul air to pass off. By using stop-cocks or their equivalents in the tubes or air-channels I am able to regulate the current of air passing through them or shut it off altogether, whether it comes from without or is the air in the room used over and over again.

A box placed on or connected with the cover of the chamber in the top of the cooler, and filled with ice, is used to produce a more rapid current when necessary.

Charcoal or any of the purifying substances hereinbefore referred to may be used in said tubes or ducts for the purpose of purifying the air before it is taken into the lungs. The air may also be medicated or perfumed. Sponge, gauze, or their equivalents, is also used to exclude dust and insects from the room.

To avoid the risk of having the temperature lower than may be desirable at times, the cooler may be incased with wood or other material, so as to exclude all air from the effects of the ice except that which is permitted to pass down the tubes or channels.

By simply turning the valves in the tubes the column of air passing down may be increased or diminished, thus preventing the waste of ice and regulating the temperature at will.

The cooler is elevated a few inches above the floor, to give free circulation of air, and also to receive a shallow vessel placed beneath it to catch the condensed water or "sweat" which may gather in the tubes.

I also construct coolers in connection with refrigerators for cooling or preserving food or liquids. When they are used for cooling apartments and food at the same time, I make water-tight compartments or recesses, which are more or less surrounded by the cold liquid or cold air; or chambers may be made and placed outside of, and in contact with, the cooler, so as to be cooled by its contents.

I ventilate these chambers or compartments by means of air conducted through tubes passing through the cold liquid. One end of the tube opens in the said chamber, and the other end opens into the room in which the cooler is placed, or is connected with one of the air ducts or tubes in the cooler, or those connected thereto. I also attach the cooler to sideboards, desks, and other articles of furniture which may require a cool atmosphere for any purpose. For the purpose of drawing off the water from the cooler, I either conduct it into the waste-pipe usually found in rooms which have a supply of water from a reservoir, or insert a cock and draw it off into any convenient vessel.

It will be perceived that I combine a water-cooler, a refrigerator, and an air-cooler, capable of being carried from one room to another, making the rooms healthful and comfortable, and having a perfect system of ventilation.

The several modes of cooling, drying, and purifying air herein described are applicable to hospitals, churches, and other buildings; also, for cooling dairies, preserving-houses, storehouses, and the like, and for drying and preserving fruits and vegetables.

Suitable instruments for indicating the temperature, moisture, and electric condition of the air, and for detecting the amount of ozone, carbonic acid, and other matters affecting the chemical condition of the air, should be placed in buildings used for my inventions; for it is well known that all these conditions change, more or less, the character of the air as regards its effects on animal and vegetable life, and on all organic matter.

Instead of compressing air and liquids by means of a weight falling perpendicularly, as described, I accomplish the same result, but with a greater loss of power, by sliding or rolling the piston or weight down an incline plane into the cylinder.

There has always been a great difficulty in preventing the active fermentation in cane-juice in tropical climates.

By constructing a sugar-house according to the principles above described, cane-juice may be always kept from fermentation, and the loss of sugar from that source prevented. Any of the means above described for cooling air or liquids may be employed, as well as the mode of constructing walls, roof, and other features of the building. The air may also be dried and purified by any of the means above specified.

Having thus described my invention, what I claim as new, and desire to secure by Letters Patent, is—

1. The processes for preserving animal and vegetable substances, substantially as herein described.

2. Construction of buildings, fixtures, and apparatus, substantially as and for the purpose set forth.

3. Compressing air, gas, and liquids, substantially as described, and for the purposes specified.

4. The combination of the buildings, apparatus, and devices, substantially as set forth.

5. The buildings and apparatus, in combination with processes substantially as described, and for the purposes set forth.

6. As forming part of an establishment for curing and packing meat, the following three classes of devices and processes in combination, viz: means and devices for cooling, for drying, and for purifying, substantially as described.

7. Means for excluding warm air, dust, insects, &c., in combination with means for cooling the air admitted, substantially as described.

8. Means for excluding warm air, dust, and insects, &c., in combination with means for purifying the air admitted.

9. Means for excluding warm air, dust, insects, &c., in combination with the means for drying the air admitted, substantially as described.

10. Salting and packing meat in buildings constructed for the exclusion of warm air, substantially as described.

11. The use of deutoxide of nitrogen, sulphurous acid, alkaline sulphites, or other equivalent deoxidizing substances in salting and curing meat, substantially as described.

12. Curing meat by means of gases under pressure, substantially as described.

13. Curing meat by means of materials in fine powder by pressure, substantially as described.

14. Utilizing the offal and other waste products from slaughter and packing houses by means of cooling, drying, and preservative agents, substantially as described.

15. The use of pressure and agitation in salting meat, substantially as described.

16. Apparatus for carrying the cattle to the slaughter-house, substantially as described.

17. The construction of a sugar-house with means herein specified for excluding heat, dust, and insects.

18. Cooling cane-juice by the employment of the means substantially as herein described.

19. Lowering the temperature of the air in sugar-houses, substantially as set forth.

20. Purifying the air admitted to sugar-houses, substantially as described.

21. Constructing sugar-houses with walls, roofs, floors, windows, screens, and ventilators, substantially as described.

22. Preventing fermentation by the means substantially as herein described.

D. E. SOMES.

Witnesses:
I. Y. KNIGHT,
WM. HERVEY.